US011704601B2

(12) United States Patent
Averbukh et al.

(10) Patent No.: US 11,704,601 B2
(45) Date of Patent: Jul. 18, 2023

(54) POISSON DISTRIBUTION BASED APPROACH FOR BOOTSTRAP AGGREGATION IN A RANDOM FOREST

(71) Applicant: Intel Corporation, Santa Clara, CA (US)

(72) Inventors: Mikhail Averbukh, Nizhny Novgorod (RU); Mohammad R. Haghighat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 16/716,018

(22) Filed: Dec. 16, 2019

(65) Prior Publication Data
US 2020/0118006 A1 Apr. 16, 2020

(51) Int. Cl.
*G06N 20/20* (2019.01)
*G06F 17/18* (2006.01)
*G06F 18/214* (2023.01)
*G06F 18/243* (2023.01)
*G06N 5/01* (2023.01)

(52) U.S. Cl.
CPC ............ *G06N 20/20* (2019.01); *G06F 17/18* (2013.01); *G06F 18/214* (2023.01); *G06F 18/24323* (2023.01); *G06N 5/01* (2023.01)

(58) Field of Classification Search
CPC .... G06F 17/18; G06K 9/6256; G06K 9/6282; G06N 20/20; G06N 5/003
See application file for complete search history.

(56) References Cited

U.S. PATENT DOCUMENTS

| 11,276,013 | B2* | 3/2022 | Jiang | G06F 16/2246 |
|---|---|---|---|---|
| 2016/0217384 | A1* | 7/2016 | Leonard | G06N 5/022 |
| 2017/0193402 | A1* | 7/2017 | Grehant | G06N 20/20 |
| 2019/0311306 | A1* | 10/2019 | Peterson | G06Q 30/02 |
| 2019/0325316 | A1* | 10/2019 | Anderson | G16H 50/30 |
| 2020/0004921 | A1* | 1/2020 | Baidya | G06N 20/20 |
| 2020/0034701 | A1* | 1/2020 | Ritter | G06F 9/5005 |
| 2020/0034750 | A1* | 1/2020 | Ritter | G06N 20/00 |
| 2020/0074306 | A1* | 3/2020 | Giral | G06N 20/20 |
| 2020/0097858 | A1* | 3/2020 | Baikalov | G06F 18/2148 |

OTHER PUBLICATIONS

Wikipedia, "Poisson Distribution", <en.wikipedia.org/wiki/Poisson_distribution#Assumptions_and_validity>, retrieved Nov. 27, 2019, 17 pages.
J. Cook, "C# Code for Computing Log Factorial," <johndcook.com/blog/csharp/_log_factorial>, retrieved Dec. 3, 2019, 10 pages.
P. Carlini, "Poisson Distribution are not Distributed Correctly," <mail-archive.com>, retrieved Nov. 27, 2019, 17 pages.

* cited by examiner

*Primary Examiner* — Mohamed A. Wasel
(74) *Attorney, Agent, or Firm* — Jordan IP Law, LLC

(57) ABSTRACT

Systems, apparatuses and methods may provide for technology that generates inclusion data in accordance with a Poisson distribution, wherein the inclusion data specifies a number of inclusions for each observation in a set of observations. The technology may also train a first decision tree in a random forest based at least in part on the inclusion data.

24 Claims, 8 Drawing Sheets

POISSON DISTRIBUTION BASED APPROACH FOR BOOTSTRAP AGGREGATION IN A RANDOM FOREST

TECHNICAL FIELD

Embodiments generally relate to machine learning decision trees. More particularly, embodiments relate to a Poisson distribution based approach for bootstrap aggregation in a random forest.

BACKGROUND

Machine learning technology may be used to perform automated classifications (e.g., in an object recognition and/or natural language processing/NLP application), regression analysis (e.g., in an application that identifies relationships between a dependent variable and one or more independent variables), and so forth. For example, a machine learning implementation might include a set of decision trees, which are trained to split observation data on a binary basis at each node of the decision tree. A "random forest" may randomly and uniformly sample (e.g., with replacement) the observation data for each decision tree in the forest during training. Such an approach to sampling the observation data may result in memory access patterns that are inefficient on most hardware platforms. Accordingly, there may be a negative impact on performance, power consumption and/or battery life.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
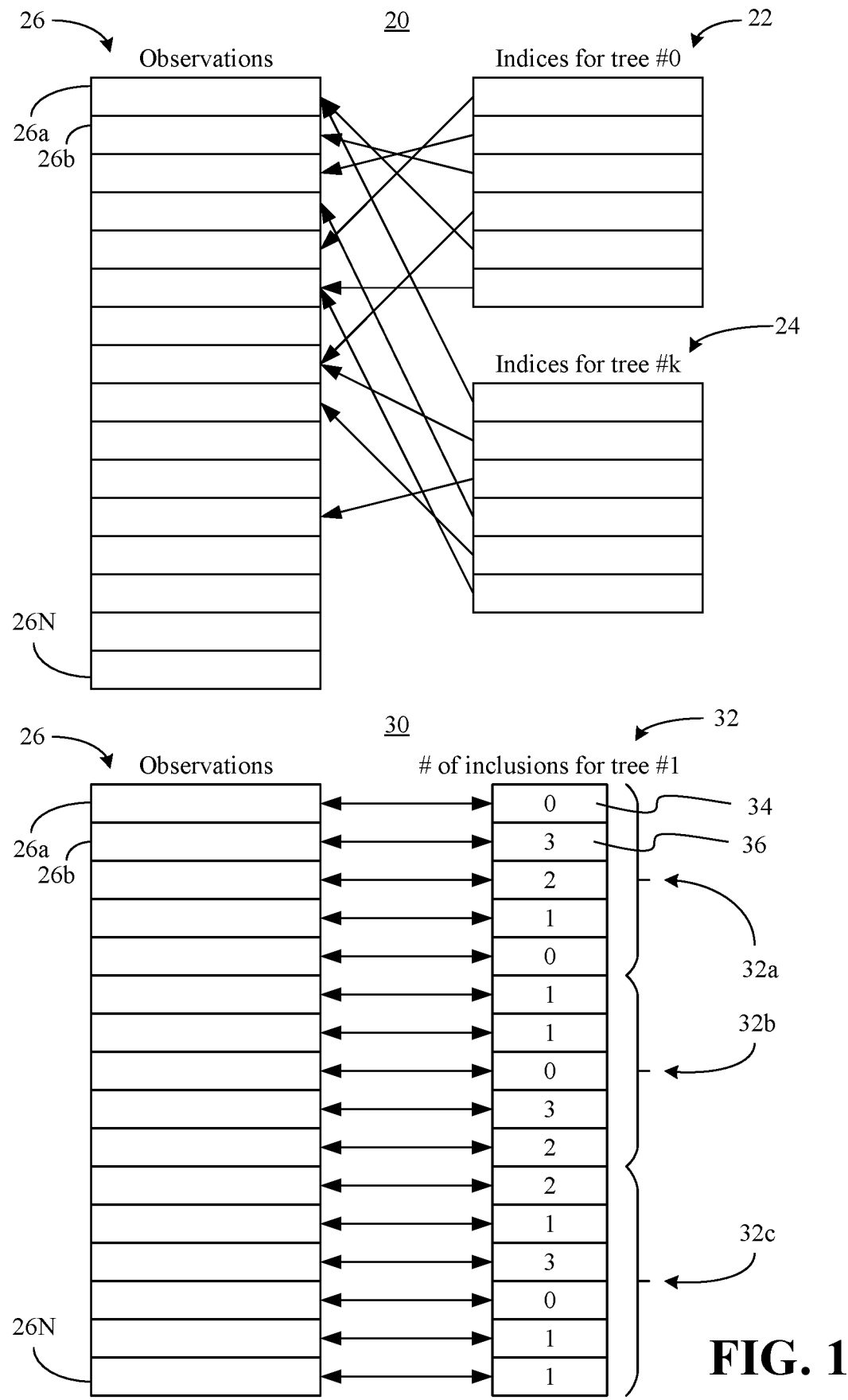
FIG. 1 is a comparative illustration of an example of a conventional memory access pattern and a memory access pattern according to an embodiment.

Turning now to FIG. 1, a conventional memory access pattern 20 is shown in which a first set of indices 22 is associated with a first tree ("tree #0") and a second set of indices 24 is associated with a $k^{th}$ tree ("tree # k"). The first and second trees may be decision trees in a random forest that is trained to perform automated classifications, regression analysis, and so forth. In the illustrated example, the first set of indices 22 is randomly and uniformly sampled from indices corresponding to a set of observations 26 (26a-26N). Each observation in the set of observations 26 may generally include feature values such as, for example, [feature: color, value: green], [feature: pixel location, value: $x_i$, $y_i$], etc. Similarly, the second set of indices 24 may be randomly and uniformly sampled from the indices corresponding to the set of observations 26.

In the illustrated example, the sets of indices 22, 24 are used during a bootstrap aggregation procedure to retrieve data from the set of observations 26 for training purposes. Accordingly, the illustrated conventional access pattern 20 is random in nature. Of particular note is that, the random nature of the conventional access pattern 20 may be inefficient from the perspective of hardware components such as cache memory, cache controllers, system memory, memory controllers, and so forth.

By contrast, an enhanced memory access pattern 30 may provide for the generation of inclusion data 32 (32a-32c) in accordance with a Poisson distribution, where the inclusion data 32 specifies a number of inclusions for each observation in the set of observations 26. Thus, a first element 34 in the inclusion data 32 might indicate/specify that a first observation 26a is to be included in training data for a given tree ("tree #1") zero times, a second element 36 in the inclusion data 32 may indicate that a second observation 26b is to be included in the training data for the given tree three times, and so forth. In an embodiment, the Poisson distribution is a discrete probability distribution that expresses the probability of a given number of events occurring in a fixed interval of time or space if the events occur with a known constant rate and independently of the time since the last event. The Poisson distribution may guarantee the same probability of inclusion for each observation into an individual decision tree training set, while generating directly the number of times that each specific observation is included into an individual decision tree training set. Thus, the Poisson distribution may be readily used to generate the inclusion data 32 randomly with respect to the indices corresponding to the set of observations 26.

In the illustrated example, the inclusion data 32 is used during the bootstrap aggregation procedure to retrieve the data from the set of observations 26 for training purposes. More particularly, the observation data may be sequentially (or near-sequentially) retrieved from memory in accordance with the inclusion data 32. For example, the observation data corresponding to a first portion 32a may be small enough to fit in a single cache line. In such a case, fewer cache misses may be encountered. Similarly, the observation data corresponding to the first portion 32a, a second portion 32b and a third portion 32c of the inclusion data 32 may be able to fit in a contiguous memory region in system memory. If so, memory accesses may again be more efficient. Accordingly, the enhanced memory access pattern 30 achieves better performance, lower power consumption and/or extended battery life relative to the conventional memory access pattern 20.

Figure 2:
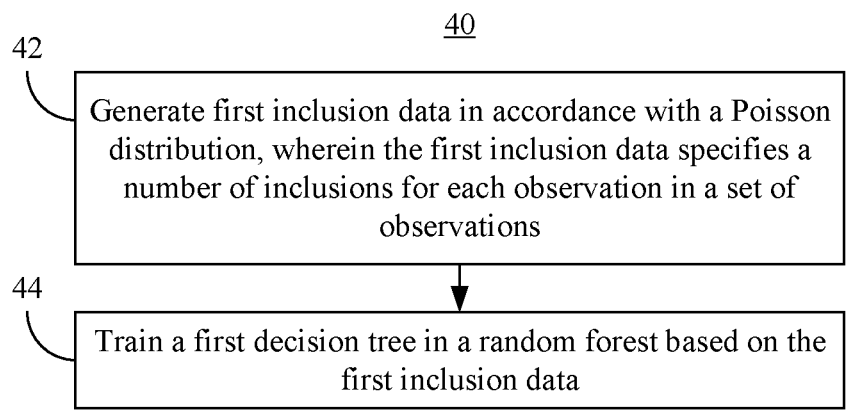
FIG. 2 is a flowchart of an example of a method of operating a performance-enhanced computing system according to an embodiment.

FIG. 2 shows a method 40 of operating a performance-enhanced computing system. The method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 provides for generating first inclusion data in accordance with a Poisson distribution, wherein the first inclusion data specifies a number of inclusions for each observation in a set of observations. In an embodiment, block 42 includes applying one or more constants associated with the Poisson distribution to indices associated with the set of observations. For example, the Poisson distribution formula is, $$P(X = x) = \frac{\lambda^x e^{-\lambda}}{x!}$$

where x=1, 2, 3, . . . , λ=mean number of occurrences in the interval, and e=Euler's constant≈2.71828. Additionally, the Poisson related Entropy formula is, Ln(2\**Pi*)/2=0.91893853320467267.

Thus, the constants may include a natural log of a value, wherein the value may be a factorial value. Table I below shows various constants that might be used to efficiently determine the Poisson distribution formula.

TABLE I

| Value | Mathematical Basis |
|---|---|
| 0.91893853320467267 | Ln(2 \* Pi)/2 |
| 0.69314718055994529 | Ln(2!) |
| 1.7917594692280550 | Ln(3!) |
| 3.1780538303479458 | Ln(4!) |
| 4.7874917427820458 | Ln(5!) |
| 6.5792512120101012 | Ln(6!) |
| 8.5251613610654147 | Ln(7!) |
| 10.604602902745251 | Ln(8!) |
| 12.801827480081469 | Ln(9!) |
| 0.0128205128205128205128205128205128L | $\frac{1}{78}$ |
| 1.0129030479320018583185514777512983L | $e^{\left(\frac{1}{78}\right)}$ |
| 1.2533141373155002512078826424055226L | $\sqrt{\left(\frac{Pi}{2}\right)}$ |

Other constants may also be used (e.g., in various library implementations). Block 44 trains a first decision tree in a random forest based on the first inclusion data. In one example, block 44 includes retrieving observation data, incorporating the retrieved observation data into a training data set associated with the first decision tree, and splitting the set of observations in an entirety based on an impurity metric, as will be discussed in greater detail. The method 40 may be repeated for a plurality of decision trees in the random decision tree forest (e.g., generating second inclusion data for a second decision tree, third inclusion data for a third decision tree, etc., and training the additional decision trees based on the additional inclusion data). In an embodiment, the number of decision trees in the forest and the number of observations in a training set for each decision tree are application-specific parameters. The illustrated method 40 therefore results in an enhanced memory access pattern that achieves better performance, lower power consumption and/or extended battery life relative to conventional memory access patterns.

Figure 3:
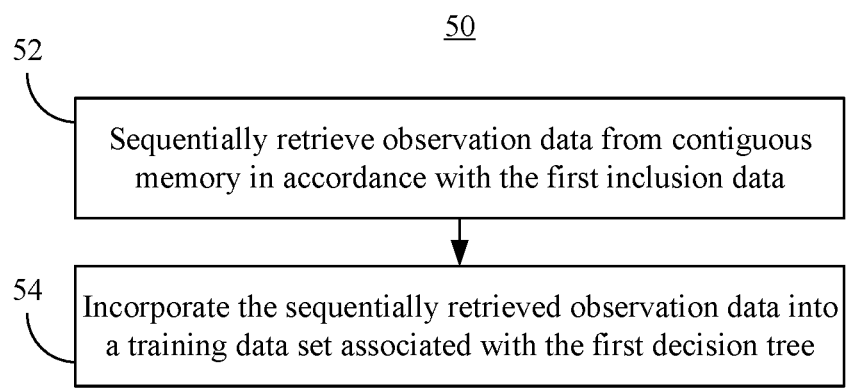
FIG. 3 is a flowchart of an example of a method of training a decision tree according to an embodiment.

FIG. 3 shows a method 50 of training a decision tree. The method 50 may generally be incorporated into block 44 (FIG. 2), already discussed. More particularly, the method 50 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 52 provides for sequentially (or near sequentially) retrieving observation data from contiguous memory (e.g., cache line, contiguous memory region in system memory, storage block, etc.) in accordance with the first inclusion data. Additionally, block 54 incorporates the sequentially retrieved observation data into a training data set associated with the first decision tree, wherein the first decision tree is trained further based on the training data set. Training the first decision tree may involve making split decisions (e.g., binary splits) at each node of the decision tree based on an impurity metric. Sequentially retrieving the observation data as shown avoids and/or minimizes random memory access patterns that may degrade performance.

Figure 4:
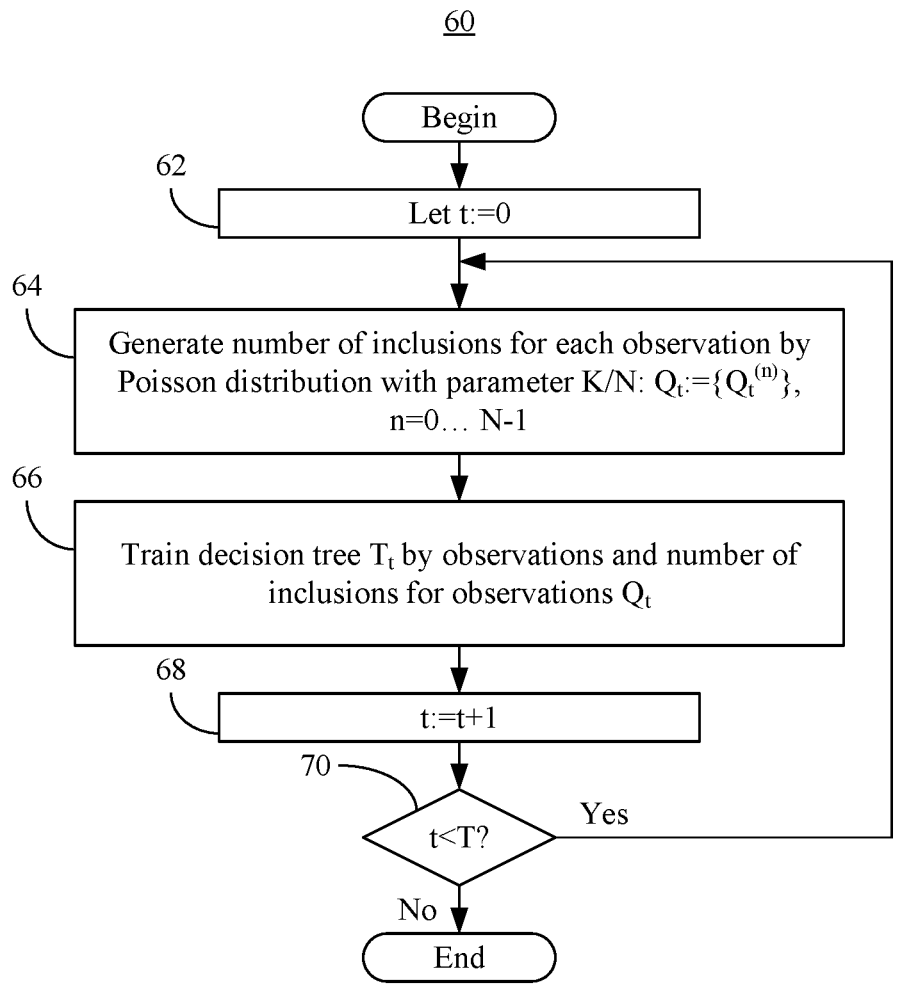
FIG. 4 is a flowchart of an example of a method training a random forest according to an embodiment.

FIG. 4 shows a method 60 of training a random forest, where T is the number of trees, N is the number of observations, K is the number of observations for individual tree training, P is the number of features, and M is the number of features to choose for each node of the tree (e.g., M≤P). The method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 initializes the value of t, where a number of inclusions $Q_t^{(n)}$ is generated at block 64 for each observation in accordance with the Poisson distribution. Block 66 trains the decision tree $T_t$ by observations and the number of inclusions. The value of t may be incremented at block 68, where illustrated block 70 determines whether the total number of trees has been reached. If not, the method 60 returns to block 64. Otherwise, the method 60 may terminate.

Figure 5:
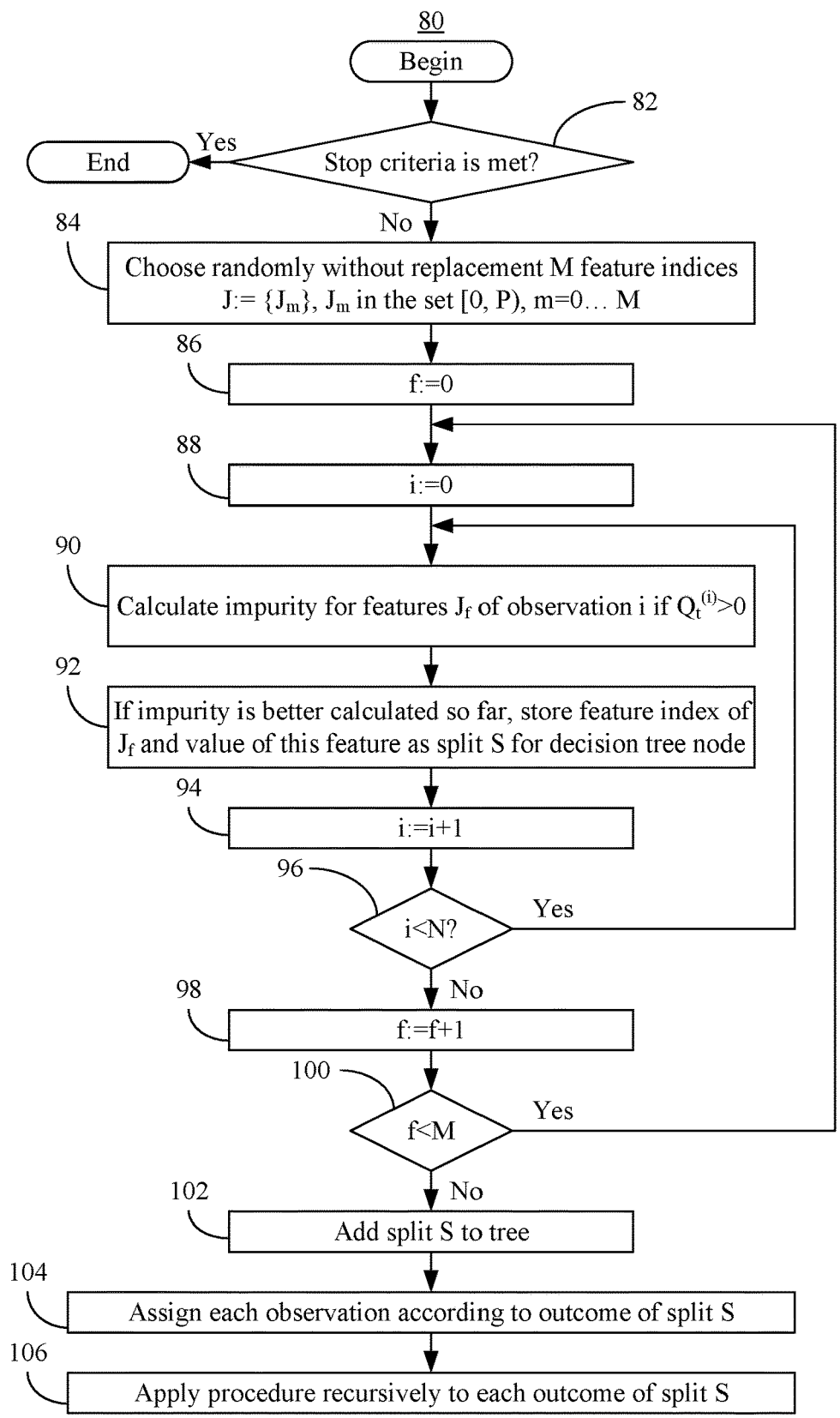
FIG. 5 is a flowchart of an example of a more detailed method of training a decision tree according to an embodiment.

FIG. 5 shows a more detailed method 80 of training a decision tree. The method 80 may generally be incorporated into block 66 (FIG. 4), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 determines whether a one or more stopping criteria (e.g., confidence threshold is reached) is met. If so, the method 80 may terminate. Otherwise, block 84 chooses randomly without replacement M feature indices, where block 86 initializes a parameter f. Additionally, a parameter i is initialized at block 88. Block 90 may calculate the impurity (e.g., quantifying split quality) for the included features. If the impurity is better calculated so far, block 92 stores the current feature index and the corresponding feature value as split S for the decision tree node.

Illustrated block 94 increments the parameter i, where a determination may be made at block 96 as to whether the total number of observations has been reached. If not, the method 80 may return to block 90. Otherwise, block 98 increments the parameter f and block 100 determines whether the number of features to choose for each node of the tree has been reached. If not, the method 80 returns to block 88. If the number of features to choose for each node of the tree has been met, illustrated block 102 adds split S to the tree. In an embodiment, block 104 then assigns each observation according to the outcome of split S, where block 106 may apply the procedure recursively to each outcome of split S.

Figure 6:
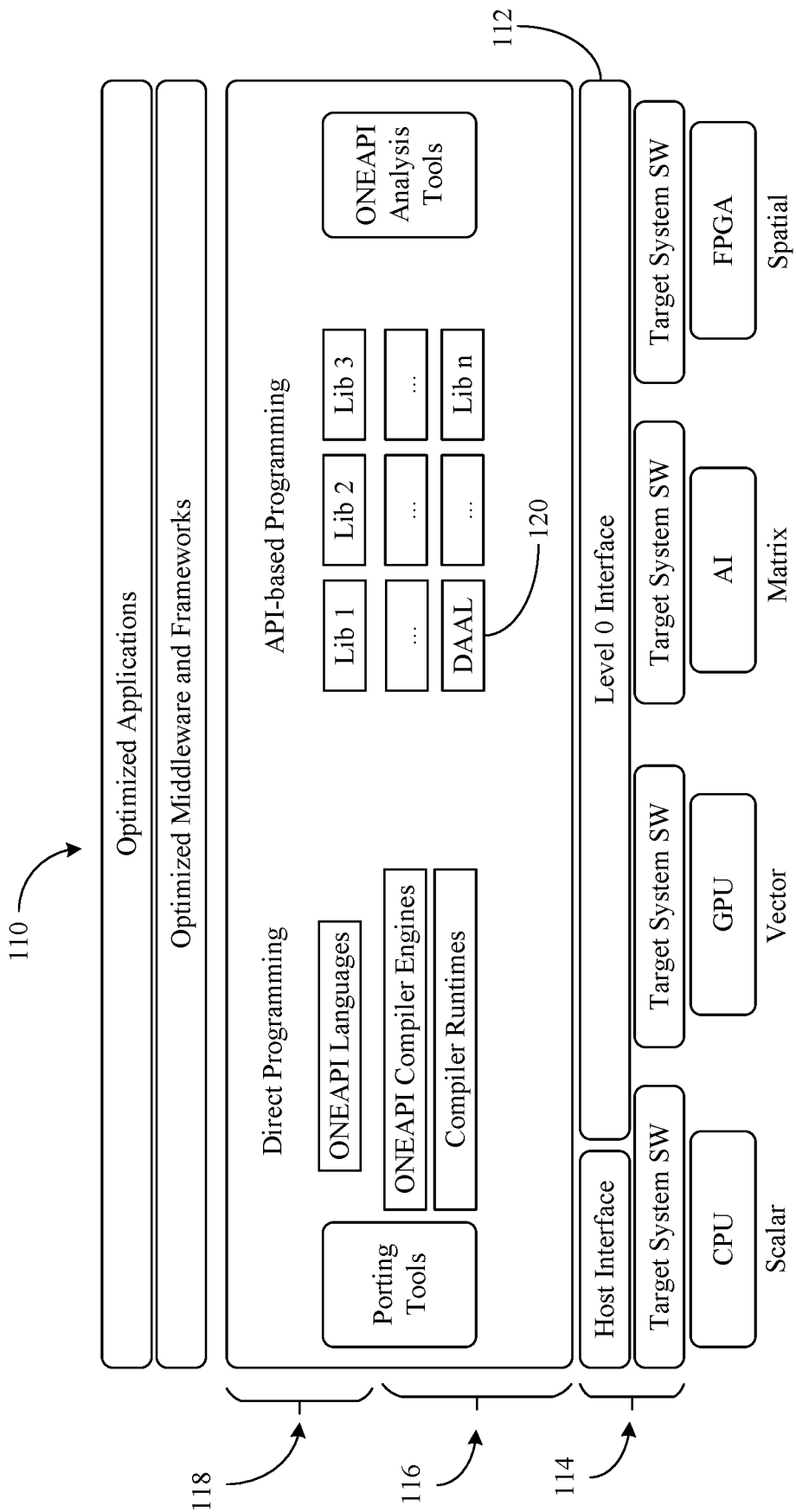
FIG. 6 is a block diagram of an example of a software stack according to an embodiment.

FIG. 6 shows a unified software stack 110 that includes a level 0 interface 112, system software (SW) 114 below the level 0 interface, system software 116 above the level 0 interface 112, and a developer interface 118. The system software 114 below the level 0 interface 112 interfaces with hardware such as, for example, a CPU (central processing unit, e.g., which might support scalar operations), a GPU (graphics processing unit, e.g., which may support vector operations), an AI (artificial intelligence) accelerator (e.g., which might support matrix operations), and an FPGA (e.g., which may support spatial operations). Additionally, the developer interface 118 interacts with optimized middleware and associated frameworks, which in turn support one or more optimized applications. In an embodiment, a library 120 such as, for example, a DAAL (Data Analytics Acceleration Library), includes the functionality of method 40 (FIG. 2), method 50 (FIG. 3), method 60 (FIG. 4) and/or method 80 (FIG. 5), already discussed.

Figure 7:
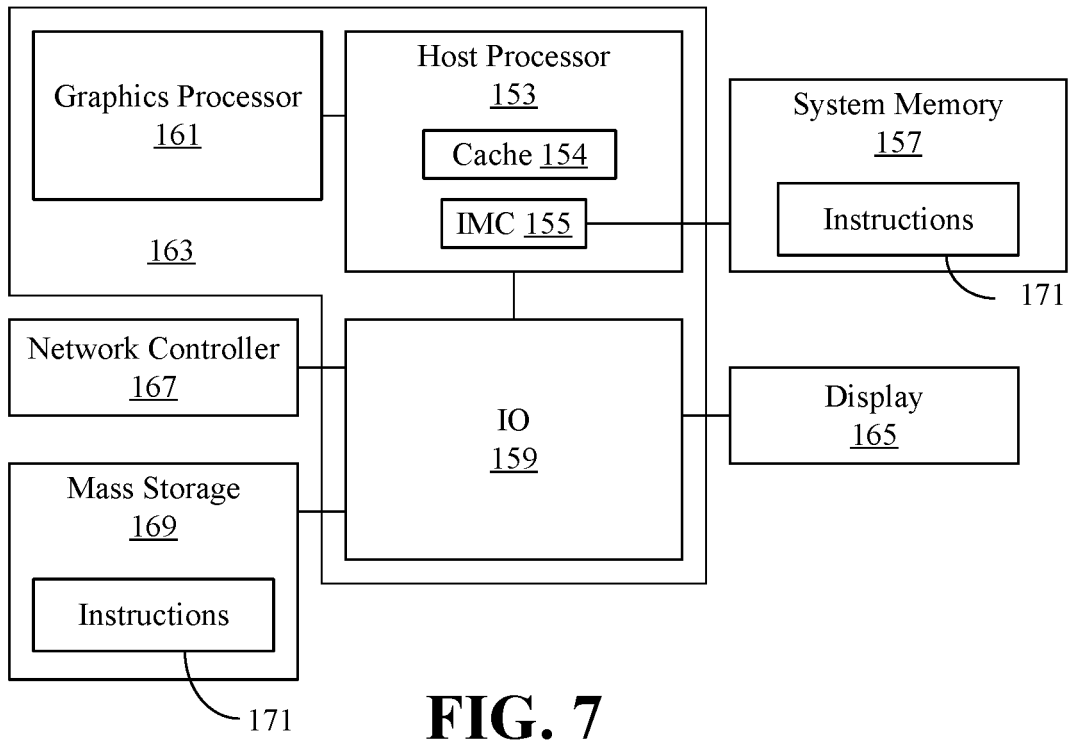
FIG. 7 is a block diagram of an example of a performance-enhanced computing system according to an embodiment.

Turning now to FIG. 7, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 151 includes a host processor 153 (e.g., CPU with a plurality of cores) having a cache 154 and an integrated memory controller (IMC) 155 that is coupled to a system memory 157.

The illustrated system 151 also includes an input output (10) module 159 implemented together with the host processor 153 and a graphics processor 161 on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory). In an embodiment, the network controller 167 obtains (e.g., receives, requests) a set of observations.

In an embodiment, the host processor 153, the graphics processor 161 and/or the IO module 159 execute program instructions 171 retrieved from the system memory 157 and/or the mass storage 169 to perform one or more aspects of the method 40 (FIG. 2), method 50 (FIG. 3), method 60 (FIG. 4) and/or method 80 (FIG. 5), already discussed. Thus, execution of the illustrated instructions 171 may cause the computing system 151 to generate first inclusion data in accordance with a Poisson distribution, wherein the first inclusion data specifies a number of inclusions for each observation in the set of observations. Execution of the instructions 171 may also cause the computing system 151 to train a first decision tree in a random forest based at least in part on the first inclusion data. The illustrated system 151 is therefore performance-enhanced at least to the extent that the memory access pattern for the observation data is more efficient with respect to the cache 154, the system memory 157 and/or the mass storage 169. The system 151 may also achieve lower power consumption and/or extended battery life.

Figure 8:
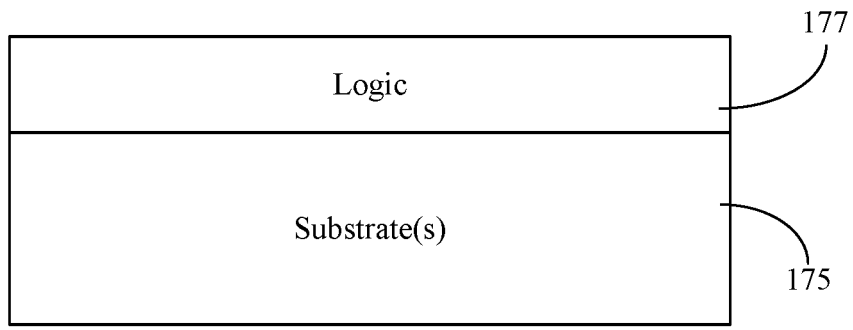
FIG. 8 is an illustration of an example of a semiconductor apparatus according to an embodiment.

FIG. 8 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 40 (FIG. 2), method 50 (FIG. 3), method 60 (FIG. 4) and/or method 80 (FIG. 5), already discussed. Thus, the logic 177 may generate first inclusion data in accordance with a Poisson distribution, wherein the first inclusion data specifies a number of inclusions for each observation in the set of observations. The logic 177 may also train a first decision tree in a random forest based at least in part on the first inclusion data. The illustrated apparatus 173 is therefore performance-enhanced at least to the extent that the memory access pattern for the observation data is more efficient with respect to the caches, system memory and/or mass storage. The apparatus 151 may also achieve lower power consumption and/or extended battery life.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 9:
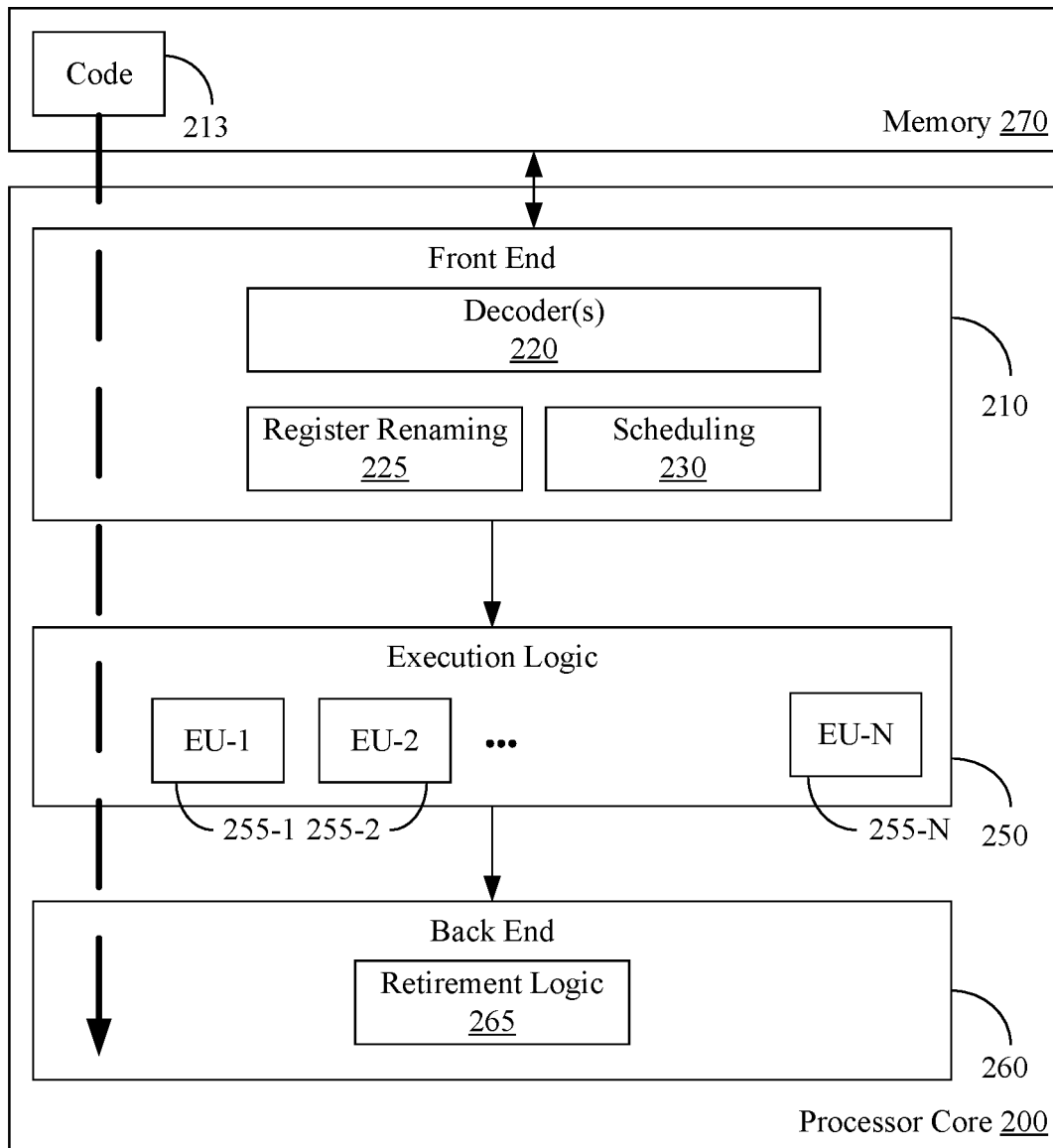
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 40 (FIG. 2), method 50 (FIG. 3), method 60 (FIG. 4) and/or method 80 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
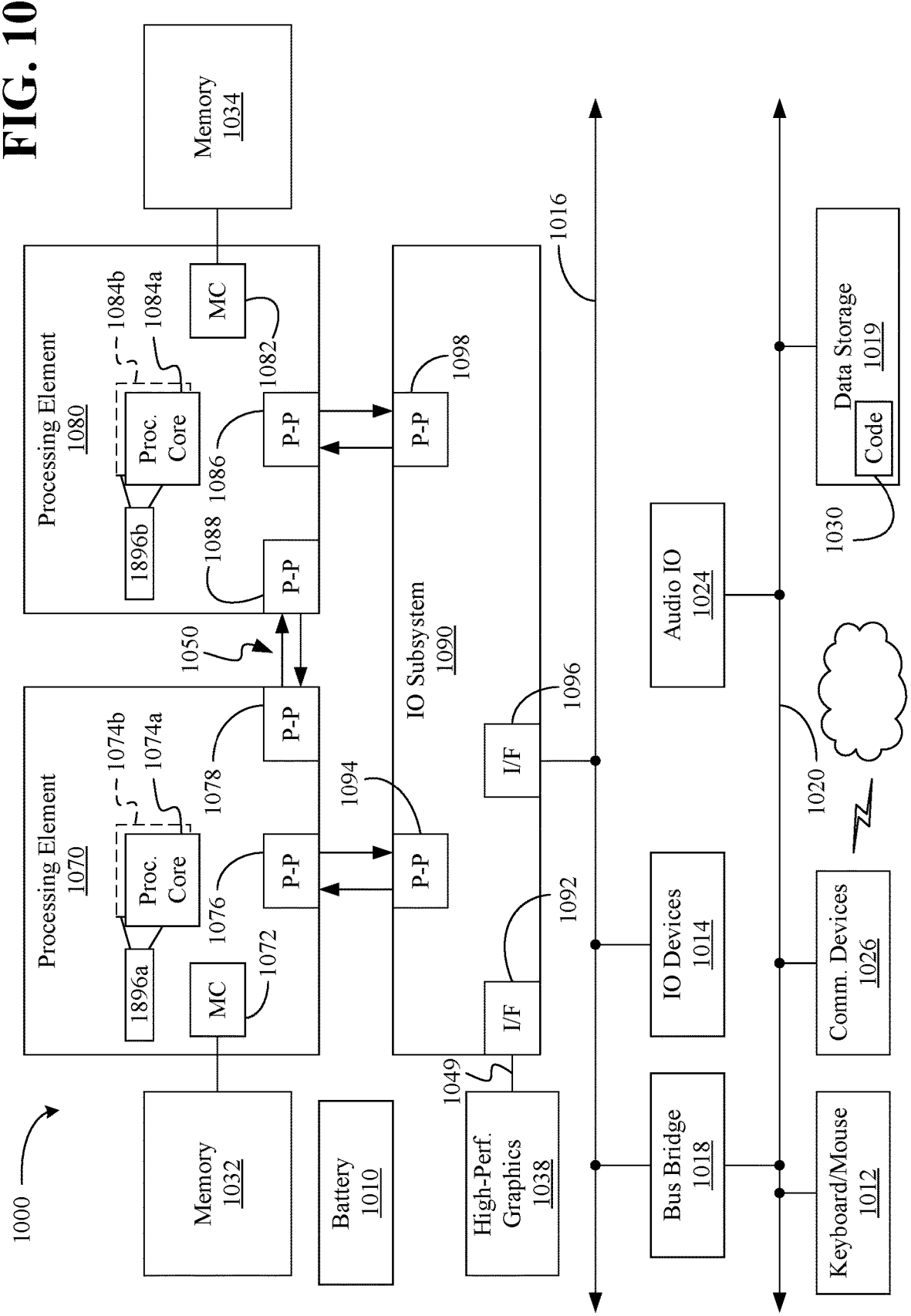
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 40 (FIG. 2), method 50 (FIG. 3), method 60 (FIG. 4) and/or method 80 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a network controller to obtain a set of observations, a processor coupled to the network controller, and a memory coupled to the processor, the memory including a set of executable program instructions, which when executed by the processor, cause the computing system to generate first inclusion data in accordance with a Poisson distribution, wherein the first inclusion data specifies a number of inclusions for each observation in the set of observations and train a first decision tree in a random forest based at least in part on the first inclusion data.

Example 2 includes the computing system of Example 1, wherein the memory further includes a contiguous memory region, and wherein to train the first decision tree, the instructions, when executed, cause the computing system to sequentially retrieve observation data from the contiguous memory region in accordance with the first inclusion data, and incorporate the sequentially retrieved observation data into a training data set associated with the first decision tree, wherein the first decision tree is to be trained further based on the training data set.

Example 3 includes the computing system of Example 1, wherein to generate the first inclusion data, the instructions, when executed, cause the computing system to apply one or more constants associated with the Poisson distribution to indices associated with the set of observations, and wherein at least one of the one or more constants includes a natural log of a value.

Example 4 includes the computing system of Example 3, wherein the value is a factorial value.

Example 5 includes the computing system of Example 1, wherein the instructions, when executed, further cause the computing system to split the set of observations in an entirety based on an impurity metric.

Example 6 includes the computing system of any one of Examples 1 to 5, wherein the instructions, when executed, further cause the computing system to generate second inclusion data in accordance with the Poisson distribution, wherein the second inclusion data specifies a number of inclusions for each observation in the set of observations, and train a second decision tree in the random forest based at least in part on the second inclusion data.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate first inclusion data in accordance with a Poisson distribution, wherein the first inclusion data specifies a number of inclusions for each observation in a set of observations, train a first decision tree in a random forest based at least in part on the first inclusion data.

Example 8 includes the semiconductor apparatus of Example 7, wherein to train the first decision tree, the logic coupled to the one or more substrates is to sequentially retrieve observation data from contiguous memory in accordance with the first inclusion data, and incorporate the sequentially retrieved observation data into a training data set associated with the first decision tree, wherein the first decision tree is to be trained further based on the training data set.

Example 9 includes the semiconductor apparatus of Example 7, wherein to generate the first inclusion data, the logic coupled to the one or more substrates is to apply one or more constants associated with the Poisson distribution to indices associated with the set of observations, and wherein at least one of the one or more constants includes a natural log of a value.

Example 10 includes the semiconductor apparatus of Example 9, wherein the value is a factorial value.

Example 11 includes the semiconductor apparatus of Example 7, wherein the logic coupled to the one or more substrates is to split the set of observations in an entirety based on an impurity metric.

Example 12 includes the semiconductor apparatus of any one of Examples 7 to 11, wherein the logic coupled to the one or more substrates is to generate second inclusion data in accordance with the Poisson distribution, wherein the second inclusion data specifies a number of inclusions for each observation in the set of observations, and train a second decision tree in the random forest based at least in part on the second inclusion data.

Example 13 includes at least one computer readable storage medium comprising a set of executable program instructions, which when executed by a computing system, cause the computing system to generate first inclusion data in accordance with a Poisson distribution, wherein the first inclusion data specifies a number of inclusions for each observation in a set of observations, and train a first decision tree in a random forest based at least in part on the first inclusion data.

Example 14 includes the at least one computer readable storage medium of Example 13, wherein to train the first decision tree, the instructions, when executed, cause the computing system to sequentially retrieve observation data from contiguous memory in accordance with the first inclusion data, and incorporate the sequentially retrieved observation data into a training data set associated with the first decision tree, wherein the first decision tree is to be trained further based on the training data set.

Example 15 includes the at least one computer readable storage medium of Example 13, wherein to generate the first inclusion data, the instructions, when executed, cause the computing system to apply one or more constants associated with the Poisson distribution to indices associated with the set of observations, and wherein at least one of the one or more constants includes a natural log of a value.

Example 16 includes the at least one computer readable storage medium of Example 15, wherein the value is a factorial value.

Example 17 includes the at least one computer readable storage medium of Example 13, wherein the instructions, when executed, further cause the computing system to split the set of observations in an entirety based on an impurity metric.

Example 18 includes the at least one computer readable storage medium of any one of Examples 13 to 17, wherein the instructions, when executed, further cause the computing system to generate second inclusion data in accordance with the Poisson distribution, wherein the second inclusion data specifies a number of inclusions for each observation in the set of observations, and train a second decision tree in the random forest based at least in part on the second inclusion data.

Example 19 includes a method of operating a performance-enhanced computing system, the method comprising generating first inclusion data in accordance with a Poisson distribution, wherein the first inclusion data specifies a number of inclusions for each observation in a set of observations, and training a first decision tree in a random forest based at least in part on the first inclusion data.

Example 20 includes the method of Example 19, wherein training the first decision tree includes sequentially retrieving observation data from contiguous memory in accordance with the first inclusion data, and incorporating the sequentially retrieved observation data into a training data set associated with the first decision tree, wherein the first decision tree is trained further based on the training data set.

Example 21 includes the method of Example 19, wherein generating the first inclusion data includes applying one or more constants associated with the Poisson distribution to indices associated with the set of observations, and wherein at least one of the one or more constants includes a natural log of a value.

Example 22 includes the method of Example 21, wherein the value is a factorial value.

Example 23 includes the method of Example 19, further including splitting the set of observations in an entirety based on an impurity metric.

Example 24 includes the method of any one of Examples 19 to 23, further including generating second inclusion data in accordance with the Poisson distribution, wherein the second inclusion data specifies a number of inclusions for each observation in the set of observations, and training a second decision tree in the random forest based at least in part on the second inclusion data.

Example 25 includes means for performing the method of any one of Examples 19 to 24.

Thus, technology described herein provides better performance for random forest procedure implementations, which may be part of a unified API such as, for example, the ONEAPI software stack (e.g., in the DAAL library). Moreover, Poisson distributions may be used to ensure that the same probability of inclusion is achieved for each observation into an individual decision tree training set, while generating directly the number of times that each specific observation is included into an individual decision tree training set.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A computing system comprising:
a network controller to obtain a set of observations;
a processor coupled to the network controller; and
a memory coupled to the processor, the memory including
a set of executable program instructions, which when executed by the processor, cause the computing system to:
generate first inclusion data in accordance with a Poisson distribution, wherein the first inclusion data specifies a number of inclusions for each observation in the set of observations, and
train a first decision tree in a random forest based at least in part on the first inclusion data.

2. The computing system of claim 1, wherein the memory further includes a contiguous memory region, and wherein to train the first decision tree, the instructions, when executed, cause the computing system to:
sequentially retrieve observation data from the contiguous memory region in accordance with the first inclusion data; and
incorporate the sequentially retrieved observation data into a training data set associated with the first decision tree, wherein the first decision tree is to be trained further based on the training data set.

3. The computing system of claim 1, wherein to generate the first inclusion data, the instructions, when executed, cause the computing system to apply one or more constants associated with the Poisson distribution to indices associated with the set of observations, and wherein at least one of the one or more constants includes a natural log of a value.

4. The computing system of claim 3, wherein the value is a factorial value.

5. The computing system of claim 1, wherein the instructions, when executed, further cause the computing system to split the set of observations in an entirety based on an impurity metric.

6. The computing system of claim 1, wherein the instructions, when executed, further cause the computing system to:
generate second inclusion data in accordance with the Poisson distribution, wherein the second inclusion data specifies a number of inclusions for each observation in the set of observations, and
train a second decision tree in the random forest based at least in part on the second inclusion data.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
generate first inclusion data in accordance with a Poisson distribution, wherein the first inclusion data specifies a number of inclusions for each observation in a set of observations;
train a first decision tree in a random forest based at least in part on the first inclusion data.

8. The semiconductor apparatus of claim 7, wherein to train the first decision tree, the logic coupled to the one or more substrates is to:
sequentially retrieve observation data from contiguous memory in accordance with the first inclusion data; and
incorporate the sequentially retrieved observation data into a training data set associated with the first decision tree, wherein the first decision tree is to be trained further based on the training data set.

9. The semiconductor apparatus of claim 7, wherein to generate the first inclusion data, the logic coupled to the one or more substrates is to apply one or more constants associated with the Poisson distribution to indices associated with the set of observations, and wherein at least one of the one or more constants includes a natural log of a value.

10. The semiconductor apparatus of claim 9, wherein the value is a factorial value.

11. The semiconductor apparatus of claim 7, wherein the logic coupled to the one or more substrates is to split the set of observations in an entirety based on an impurity metric.

12. The semiconductor apparatus of claim 7, wherein the logic coupled to the one or more substrates is to:
generate second inclusion data in accordance with the Poisson distribution, wherein the second inclusion data specifies a number of inclusions for each observation in the set of observations; and
train a second decision tree in the random forest based at least in part on the second inclusion data.

13. At least one non-transitory computer readable storage medium comprising a set of executable program instructions, which when executed by a computing system, cause the computing system to:
generate first inclusion data in accordance with a Poisson distribution, wherein the first inclusion data specifies a number of inclusions for each observation in a set of observations; and
train a first decision tree in a random forest based at least in part on the first inclusion data.

14. The at least one non-transitory computer readable storage medium of claim 13, wherein to train the first decision tree, the instructions, when executed, cause the computing system to:
sequentially retrieve observation data from contiguous memory in accordance with the first inclusion data; and
incorporate the sequentially retrieved observation data into a training data set associated with the first decision tree, wherein the first decision tree is to be trained further based on the training data set.

15. The at least one non-transitory computer readable storage medium of claim 13, wherein to generate the first inclusion data, the instructions, when executed, cause the computing system to apply one or more constants associated with the Poisson distribution to indices associated with the set of observations, and wherein at least one of the one or more constants includes a natural log of a value.

16. The at least one non-transitory computer readable storage medium of claim 15, wherein the value is a factorial value.

17. The at least one non-transitory computer readable storage medium of claim 13, wherein the instructions, when executed, further cause the computing system to split the set of observations in an entirety based on an impurity metric.

18. The at least one non-transitory computer readable storage medium of claim 13, wherein the instructions, when executed, further cause the computing system to:
generate second inclusion data in accordance with the Poisson distribution, wherein the second inclusion data specifies a number of inclusions for each observation in the set of observations; and
train a second decision tree in the random forest based at least in part on the second inclusion data.

19. A method comprising:
generating first inclusion data in accordance with a Poisson distribution, wherein the first inclusion data specifies a number of inclusions for each observation in a set of observations; and
training a first decision tree in a random forest based at least in part on the first inclusion data.

20. The method of claim 19, wherein training the first decision tree includes:
sequentially retrieving observation data from contiguous memory in accordance with the first inclusion data; and
incorporating the sequentially retrieved observation data into a training data set associated with the first decision tree, wherein the first decision tree is trained further based on the training data set.

21. The method of claim 19, wherein generating the first inclusion data includes applying one or more constants associated with the Poisson distribution to indices associated with the set of observations, and wherein at least one of the one or more constants includes a natural log of a value.

22. The method of claim 21, wherein the value is a factorial value.

23. The method of claim 19, further including splitting the set of observations in an entirety based on an impurity metric.

24. The method of claim 19, further including:
generating second inclusion data in accordance with the Poisson distribution, wherein the second inclusion data specifies a number of inclusions for each observation in the set of observations; and
training a second decision tree in the random forest based at least in part on the second inclusion data.

* * * * *